Figure 1:
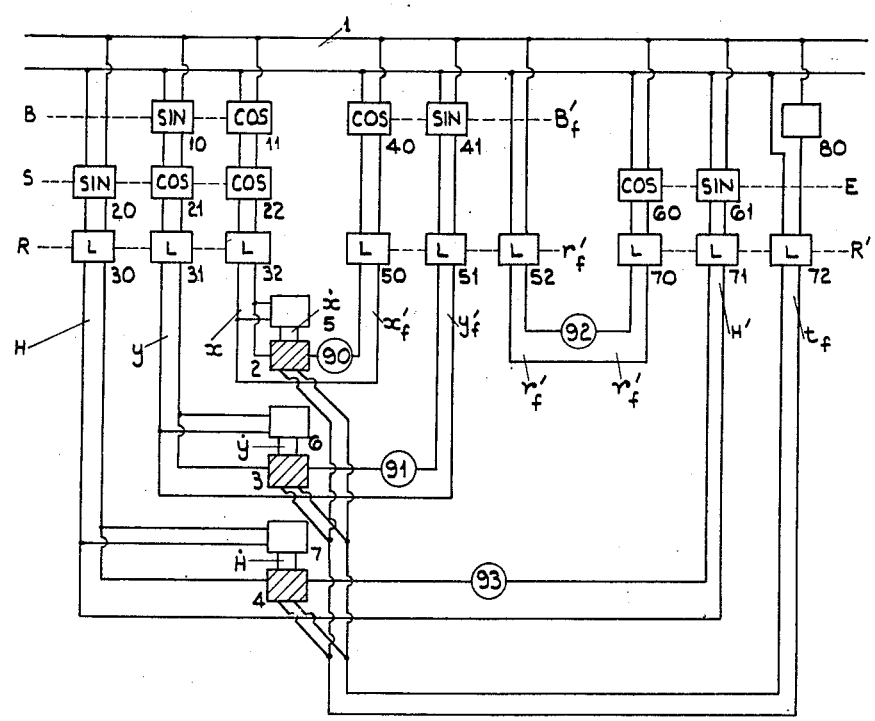

Dec. 30, 1952     L. H. BEDFORD ET AL     2,623,692
ELECTRICAL FIRE CONTROL CALCULATING APPARATUS
Filed Nov. 30, 1943     5 Sheets-Sheet 2

INVENTORS
Leslie Herbert Bedford
John Bell
Eric Miles Langham
BY Cameron, Kerkam & Sutton
ATTORNEYS Dec. 30, 1952    L. H. BEDFORD ET AL    2,623,692
ELECTRICAL FIRE CONTROL CALCULATING APPARATUS
Filed Nov. 30, 1943    5 Sheets-Sheet 3

INVENTORS
Leslie Herbert Bedford
John Bell
Eric Miles Langham
BY Cameron, Kerkam & Sutton
ATTORNEYS Dec. 30, 1952

L. H. BEDFORD ET AL 2,623,692

ELECTRICAL FIRE CONTROL CALCULATING APPARATUS

Filed Nov. 30, 1943

5 Sheets-Sheet 4

INVENTORS
Leslie Herbert Bedford
John Bell
Eric Miles Langham
BY Cameron, Kerkam & Sutton
ATTORNEYS Dec. 30, 1952 L. H. BEDFORD ET AL 2,623,692
ELECTRICAL FIRE CONTROL CALCULATING APPARATUS
Filed Nov. 30, 1943 5 Sheets-Sheet 5
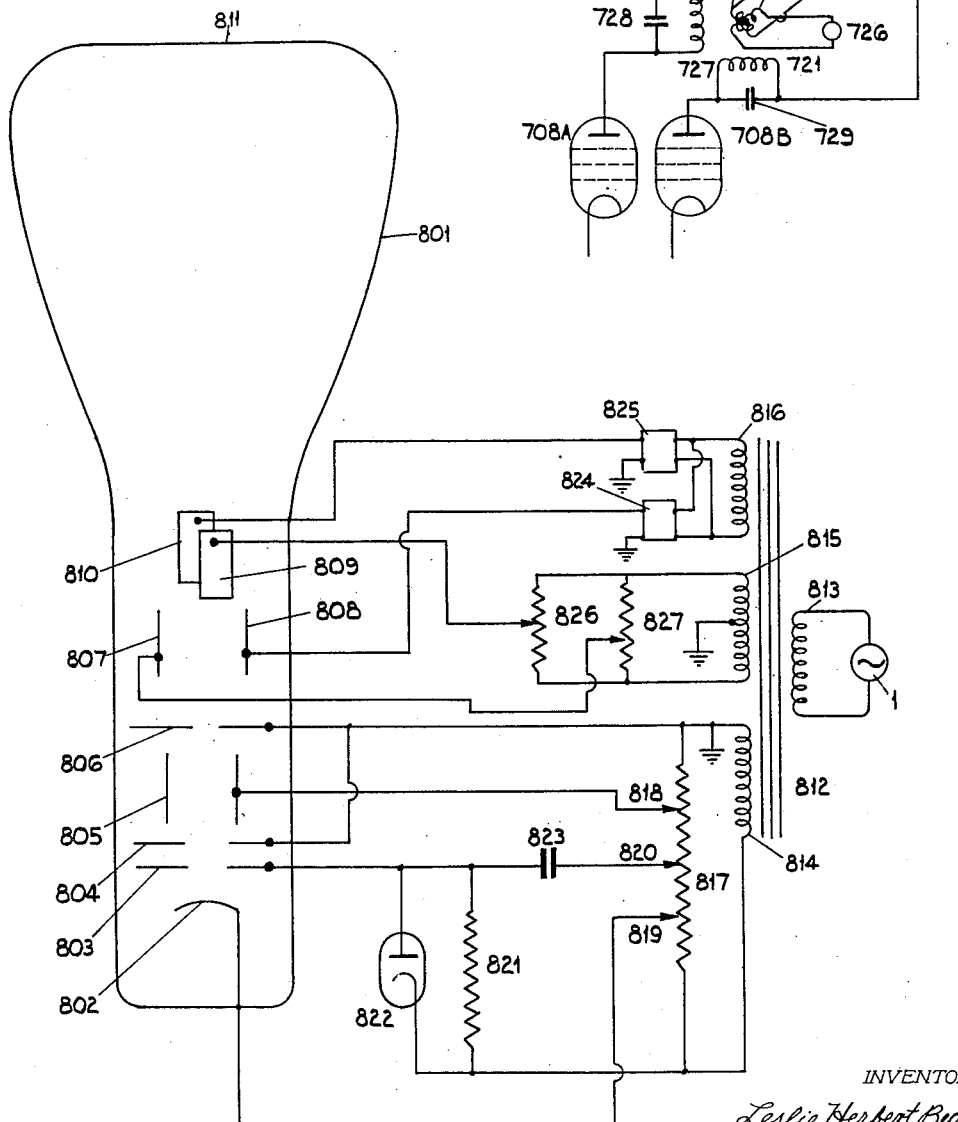
INVENTORS
Leslie Herbert Bedford
John Bell
Eric Miles Langham
BY Cameron, Kerkam & Sutton
ATTORNEYS Patented Dec. 30, 1952

2,623,692

UNITED STATES PATENT OFFICE 2,623,692

ELECTRICAL FIRE CONTROL CALCULATING APPARATUS

Leslie Herbert Bedford, London, and John Bell and Eric Miles Langham, Teddington, England; said Bedford assignor to A. C. Cossor Limited, London, England, a British company Application November 30, 1943, Serial No. 512,402
In Great Britain November 30, 1942

11 Claims. (Cl. 235—61.5)

This invention relates to electrical calculating apparatus. The principal features of the invention are directed to the design of such apparatus for operation on a low frequency alternating current supply.

One object of the invention is to provide means for producing co-phased alternating voltages which vary in amplitude in proportion to the Cartesian coordinates of a point which moves relatively to the axes of coordinates, the known data being the polar coordinates of the point. In the arrangement according to the invention this is effected by a system of cascaded potential dividers, said system deriving its input from the alternating supply source.

For producing alternating voltages which vary in accordance with the sines and cosines of angles, it is preferred that the potential dividers take the form of magslip resolvers. By this term is meant a device, which may alternatively be described as a low frequency iron-cored goniometer, which has two relatively rotatable iron-cored members, one having a primary winding and the other having two secondary windings arranged at 90° to each other, so that when the primary winding is excited from a low frequency alternating voltage source, the output voltages induced in the secondary windings are in phase with each other and have amplitudes respectively proportional to the sine and cosine of the angle of setting of one member relative to the other.

A magslip resolver may be provided with a second primary winding arranged at 90° to the first. If this be excited with alternating voltage co-phased with that which excites the first primary winding, additional co-phased voltages are induced in the two secondary windings, these being proportional to the cosine and sine respectively of the angle of setting and depending in amplitude, relative to the voltages induced by the first primary winding, on the relative amplitudes of the voltages applied to the two primary windings.

If such a second primary winding is provided, and is not required for use, it may be left on open circuit, but it is preferred that it be short-circuited.

When they are used in apparatus according to the invention, magslip resolvers are preferably provided either with means to bring the output voltages into phase with the input voltages, or with means to adjust the phase advance to a standard value. The former may, for example, take the form of condensers connected across the secondary windings, and the latter the form of resistances connected in series with the primary windings.

One disadvantage of the magslip resolver is the variation of its impedance with varying flux density. It is a feature of the invention to overcome this difficulty by so devising the system of potential dividers that the magslip resolvers have their primary windings excited at substantially constant voltage from the alternating source.

Further potential dividing of the output voltages of the magslip resolvers is effected by potentiometers. This term is to be understood in this specification as including auto-transformers as well as resistance potentiometers.

It will be understood that the term "potential divider," as applied to magslip resolvers and to auto-transformers, is intended to include devices of these kinds so arranged that the output voltages are greater than the input voltages. The divisors in these cases are fractional.

In the preferred arrangements according to the invention, cascading of variable resistance potentiometers is avoided, owing to the necessity which arises of distorting the law of the earlier potentiometer to compensate for loading the movable tapping with the later potentiometer. Where, however, variable resistance potentiometers are required to have non-linear laws (for example, where they are distorted for the purpose just described, or where they are required to give potential division in accordance with the sine or cosine of an angle represented by the setting), linear potentiometers may be employed having mechanical devices such as cams to give the necessary relationship between the potential division ratio and the control setting. The term "graded potentiometer" is to be understood as including such an arrangement.

Further aspects and objects of the invention will be apparent from the following description taken in conjunction with the accompanying claims.

The various aspects of the invention find application in apparatus of the kind known as a "predictor," the purpose of which is to derive, from data representing observed positions of a moving target, the necessary data for aiming a gun and setting the fuze of a shell to be fired at the target. The essential features of such an apparatus will now be described. In this apparatus a constant voltage is applied to a group of potential dividers, which are arranged so that their ratios can be set in accordance with observed polar coordinates of the position of the target, and can be continuously varied in accordance with the variations in these observed polar coordinates. Voltages are thus produced which are proportional to, and vary in accordance with, the corresponding Cartesian coordinates of the observed position. To these voltages there are added further voltages corresponding to the calculated changes in the Cartesian coordinates of the target position, which will occur in the calculated time which will elapse between observation of the target and impact of the shell thereon, with corrections for such factors as wind velocity, drift, and drop of the shell trajectory. The said constant voltage is also applied to another group of potential dividers, and the settings of these are continuously varied to produce voltages equal to the voltages resulting from the said additions. The continuously varying settings of the latter group of potential dividers then give the required data for aiming the gun and setting the shell fuze.

The point which will be reached by the target at the end of the calculated time of flight of the shell, assuming that the target continues to move in the same direction at uniform velocity, is called the "future position."

The point at which the gun is aimed, which will be called the "corrected future position," will be raised above the future position to allow for drop of the shell trajectory, and will also be adjusted to correct for drift, and for wind velocity.

In this specification the following symbols will be used with the meanings here stated:

B, S, R are the instantaneous observed polar coordinates of the target, namely azimuthal bearing, elevation (= angle of sight) and slant range;

$x, y, H$ are the corresponding Cartesian coordinates of the observed position of the target;

$\dot{x}, \dot{y}, \dot{H}$ are the rates of change of $x, y$ and $H$;

$t_t$ is the calculated time of flight of the shell;

$B_t'$, E, R' are the instantaneous polar coordinates of the "corrected future position"; (so $B_t'$ is the bearing and E the quadrant elevation at which the gun should be laid).

$x_t', y_t'$, H' are the corresponding Cartesian coordinates of the "corrected future position";

$r_t' = R' \cos E$;

H'' = drop of the shell trajectory;

w = wind velocity;

$B_w$ = bearing from which wind blows.

In the accompanying drawings, Figure 1 is a schematic diagram of an apparatus embodying the invention. The line 1 represents a substantially constant alternating voltage source, which may, for example, be derived from a 50 volt 50 cycle main, but which is preferably filtered to be free from harmonics. This is applied to ganged potential dividers 10 and 11 which are respectively sine and cosine potential dividers; that is to say potential dividers, the output voltages of which are respectively proportional to the sine and cosine of an angle to which they are set mechanically. The settings of these potential dividers 10 and 11 are continuously varied in accordance with the variations of the observed azimuthal bearing B of the target.

The output voltages of the potential dividers 10 and 11 are applied as input voltages to cosine potential dividers 21 and 22, while the voltage of the source 1 is applied as input to the sine potential divider 20. The potential dividers 20, 21, 22 are ganged together and their settings are all continuously varied in accordance with the variations of the observed elevation S of the target.

The output voltages of potential dividers 20, 21 and 22 are applied as input voltages respectively to ganged linear potential dividers 30, 31, 32. The settings of these are continuously varied in accordance with the variations of the observed slant range R represented on an arbitrary scale.

The output voltages of potential dividers 32, 31, 30 are then at all times proportional to the Cartesian coordinates $x, y$ and H of the observed position.

The devices 2, 3 and 4 are the means for adding to the voltages representing $x, y$ and H, further voltages corresponding to calculated changes in the Cartesian coordinates of the target position which will occur during the time of flight of the shell, to the calculated drop of the shell trajectory, and to any necessary corrections, for example, for wind and drift. These devices 2, 3 and 4 require inputs corresponding to the time of flight of the shell and to the component velocities of the target in the Cartesian coordinate directions. Voltages proportional to these velocities are developed by rate measuring devices 5, 6 and 7 operating over a period of time with input voltages representing $x, y$ and H. The method of developing a voltage corresponding to the time of flight of the shell will be considered hereafter. Other voltages, representing the necessary corrections, must be supplied to devices 2, 3 and 4, but the means for so doing are omitted from Figure 1 for the sake of simplicity.

The resultant voltages, after addition in devices 2, 3 and 4, represent the quantities $x_t', y_t'$ and H'.

The voltage source 1 is applied to cosine and sine potential dividers 40 and 41, which are ganged to be set together to the same angle. The output voltages of potential dividers 40, 41 are applied as input voltages to the linear potential dividers 50, 51 and the voltage of source 1 is applied as input voltage to linear potential divider 52. These potential dividers 50, 51 and 52 are ganged together.

The setting of potential dividers 40, 41 and the setting of potential dividers 50, 51, 52 are both continuously varied, so that null indicators 90 and 91 continuously show that the output voltages from potential dividers 50, 51 are equal to the resultant output voltages obtained after addition in devices 2 and 3. The instantaneous settings of potential dividers 40 and 41 will then represent $B_t'$ and the instantaneous settings of potentiometers 50, 51, 52 will represent $r_t'$ on an arbitrary scale.

The voltage of source 1 is further applied to cosine and sine potential dividers 60 and 61 which are ganged to be set together to the same angle. The output voltages from potential dividers 60 and 61 are applied as input voltages to linear potential dividers 70, 71 which are ganged together. The setting of potential dividers 60, 61 and the setting of potential dividers 70, 71 are both continuously varied so that null indicators 92, 93 continuously show that the output voltages from potential dividers 70, 71 are equal respectively to the output voltage of potential divider 52 and the resultant output voltage obtained after addition in device 4. The instantaneous settings of potential dividers 60, 61 will then represent E and that of potential dividers 70, 71 will represent R'.

The time of flight of the shell is approximately determined by R'. It is a non-linear function thereof, and the potential divider 72, which is ganged with potential dividers 70 and 71, is graded in accordance with this function. A resistance 80, which may be manually controlled, is introduced between the constant voltage source 1 and the input of potential divider 72, for the purpose of applying corrections necessary in view of the dependence of $t_r$ on other variables as well as R'. The output voltage from potential divider 72, representing $t_r$, is applied as hereinbefore mentioned, to devices 2, 3 and 4.

The potential dividers are so arranged that the final output voltages of each chain are exactly in phase with each other. They may be maintained in phase with the voltage of source 1, or alternatively a convenient standard phase change may be allowed in each chain of potential dividers, the same in each chain. If a phase change is allowed in potential dividers 10, 11, 40, 41, 60 and 61, then equivalent phase-shifting networks must be introduced between potential dividers 20, 52, 72 and the source 1.

It will be observed that Figure 1 discloses two systems of producing co-phased alternating voltages, the amplitudes of which represent the Cartesian coordinates of a point, the polar coordinates of which are applied as settings of potential dividers.

The simpler of these systems is that which comprises elements 10, 11, 20—22 and 30—32. In this system, however, the potential dividers 21, 22 receive inputs at varying voltages, and magslip resolvers cannot therefor satisfactorily be used. Graded potentiometers for producing output voltages proportional to the sine or cosine of an angle represented by the setting, are not easily constructed to give a comparable degree of accuracy.

The alternative system, which is therefore preferred, is exemplified by potential dividers 40, 41, 50—52, 60, 61, 70, 71 and null indicator 92. In this system all of the sine and cosine potential dividers have constant input voltages, and magslip resolvers can therefore be used. This system is particularly suitable for the purpose of finding the necessary settings of the potential dividers when the voltages, here represented by $x_r'$, $y_r'$ and H', are given. This is particularly true when the null indicators 90, 91 are combined and the null indicators 92, 93 are combined in arrangements of kinds which will be hereinafter described.

Figure 2:
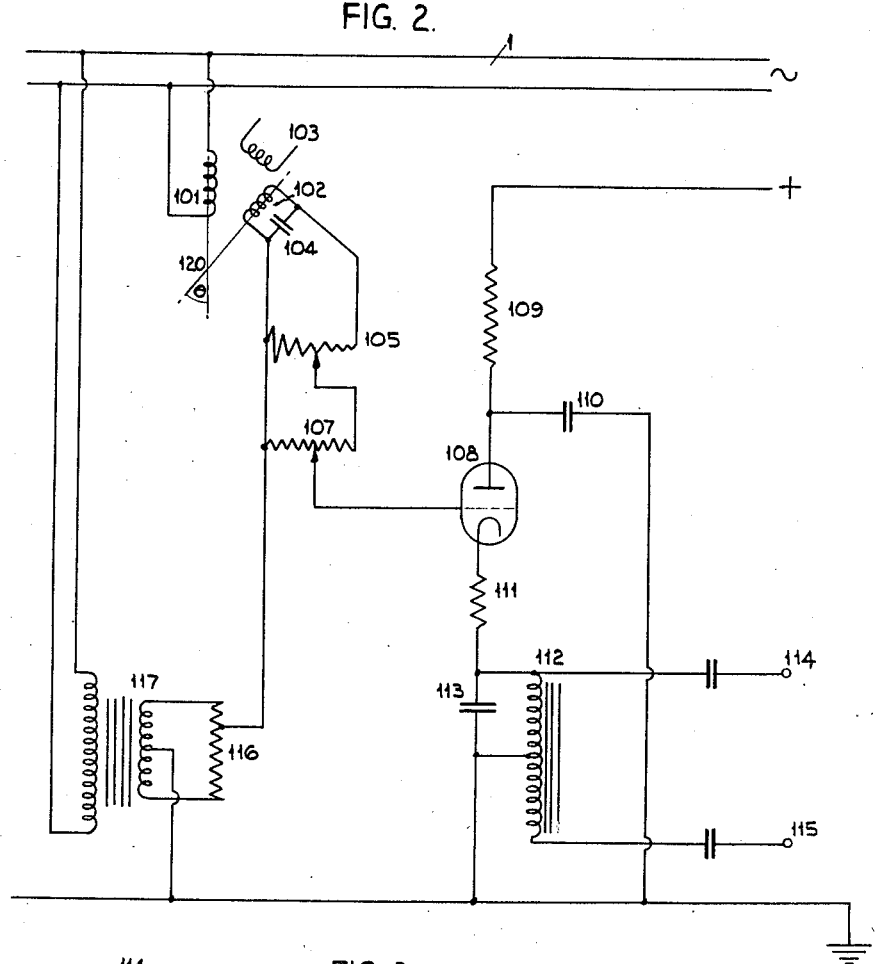

Figure 2 shows a circuit diagram of a practical arrangement of the elements 11, 22 and 32 of Figure 1, by means of which there is produced an alternating voltage having amplitude proportional to $x$.

The potential divider 11 of Figure 1 is embodied in a magslip resolver 120 having its primary winding 101, wound on the rotor, connected across the alternating current source 1.

Across the secondary winding 102, wound on the stator, is connected a condenser 104 of such capacity that the output voltage is maintained exactly in time-phase with the voltage of source 1. The amplitude of this output voltage is proportional to the cosine of the angle $\theta$ of setting.

Also connected across the stator winding 102, and representing the potential divider 22 of Figure 1, there is connected a cosine-graded potentiometer 105. This is a graded resistance potentiometer, the output voltage of which is proportional to the product of the input voltage and to the cosine of an angle represented by the setting of the movable tapping. The tapping is loaded with a linear resistive potentiometer 107, and the grading of potentiometer 105 is designed to take into account this loading of the tapping.

The linear potentiometer 107 represents the potential divider 32 of Figure 1. It has its moveable tapping connected to the input of thermionic valve 108, which is arranged as a cathode follower and which, therefore, does not load this tapping.

Valve 108 has its anode current supplied through a resistor 109 from a high tension direct current source. The anode is coupled to earth through condenser 110. The cathode load is made up of a small resistance 111 in series with the primary winding of transformer 112, which is tuned to the frequency of source 1 by condenser 113. Resistance 111 provides the necessary grid bias voltage. An output voltage of the frequency of source 1, and proportional in amplitude to $x$, is produced at output terminal 114. If a push-pull output is desired, the other side of this output is obtained at terminal 115 from a secondary winding on transformer 112. In order to obtain voltages representing coordinates referred to the gun position instead of to the observation post as origin, constant alternating voltages must be added to those which represent $x$, $y$ and H. In Figure 2, a constant alternating voltage may be added to the output voltage representing $x$, by connecting the end of potentiometer 107, as shown, to the manually adjustable tapping on a potentiometer 116 which is connected across the centre-earthed secondary winding of a transformer 117 having its primary winding connected across the source 1.

To produce a voltage proportional to $y$, a circuit identical with that shown in Figure 2 may be employed to provide elements 10, 21, 31 of Figure 1, with the exception that a sine instead of a cosine output is required from the magslip resolver. This is preferably obtained from the other secondary winding 103 of the same magslip resolver 120.

To produce a voltage proportional to H, a third similar circuit will be provided, with the exception that no magslip resolver is employed, but instead the potentiometer corresponding to 105 is directly connected across the source 1 and, in this case, is sine-graded instead of cosine-graded. The sliders of the potentiometers corresponding to 105 and 107 in the $y$ and H circuits will be ganged with the sliders of these potentiometers in the $x$ circuit.

Figure 3:
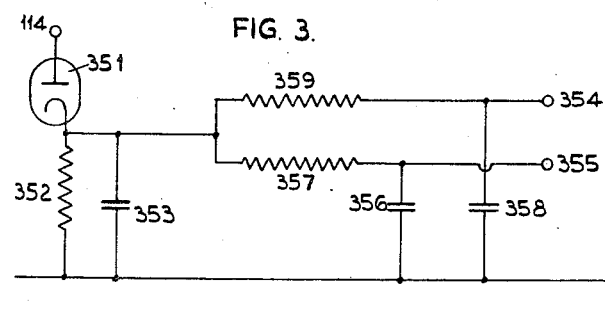

Figure 3 is a circuit diagram of a practical arrangement of the rate measuring device 5 of Figure 1; the elements 6 and 7 are similar.

In Figure 3, the 50 cycle alternating voltage proportional to $x$ derived from terminal 114, which may be the output terminal 114 of Figure 2, is rectified by diode 351, so that a direct voltage proportional to $x$ is developed across diode load 352 and condenser 353. This direct voltage is applied to two circuits of different time constants, in parallel with each other and comprising respectively condenser 355 in series with resistance 357 and condenser 358 in series with resistance 359. In a typical example, the resistances 357 and 359 may each have the value 1 megohm while the condensers 356 and 358 have respectively the values 4 microfarads and 8 microfarads. If the value of $x$ varies linearly for a period of time, the difference between the direct voltages built up across the condensers 356 and 358 of the time constant circuits represents, after a time interval, the value of $\dot{x}$ (the rate of change of $x$). This difference voltage representing $\dot{x}$ is developed as a direct output voltage between terminals 354 and 355, neither of which is earthed.

Figure 3A:
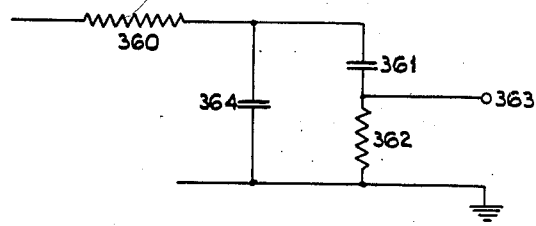

Figure 3A is a fragmentary diagram showing an alternative arrangement of the time constant circuits of Figure 3, which has the advantage that one side of the output voltage representing the value of $\dot{x}$ is earthed and that inaccuracies due to leakage are minimised. In the arrangement of Figure 3A, resistance 360 is common to both time constant circuits, while resistance 362 is included in the circuit of condenser 361 only. The difference between the voltages developed across condensers 364 and 361, which is a measure of the value $\dot{x}$, appears between the terminal 363 and earth. In a typical example the values of resistances 360 and 362 may be 0.27 and 1.0 megohms respectively, while the values of condensers 354 and 361 may both be 2 microfarads. It will be found that, if the voltage applied at terminal 114, after being constant for a while, begins to change at a steady rate, the magnitude of the voltage between terminal 363 and earth will represent the rate of change with an accuracy within 1% after 30 seconds from the beginning of the change.

When the variation of the voltage is not linear, the measurement which is obtained is a weighted average value, in which the later rates of change are given greater significance than the earlier.

Although the time constant circuits are shown as earthed at their lower ends, the circuits of Figures 3 and 3A will function satisfactorily if, instead, the line shown as earthed is maintained at any fixed alternating potential to earth in phase with that of terminal 114.

If the amplitude of the alternating voltage input at terminal 114 relative to earth is liable to pass through zero, the system fails owing to the inability of the rectifier to give sense indication. This difficulty is overcome by superposing upon the varying alternating voltage, the rate of change of which is to be measured, an alternating voltage having the same phase and having a constant amplitude greater than the maximum amplitude of said varying alternating voltage. This may be applied between earth and the line shown as earthed in Figures 3 and 3A.

It will be observed that the voltage, the rate of change of which is measured, is actually the varying direct voltage established across the diode load 352. The upper end of this load, connected to the cathode of the diode, is a point at high D. C. resistance to earth, but the lower end, even if it be connected to an alternating supply line, is at low D. C. resistance to earth. The advantages of the arrangement of Figure 3A are attained in all cases where one side only of the direct voltage is at low D. C. resistance to earth, and the junction of condenser 364 and resistance 362 is connected to this side.

Figure 4:
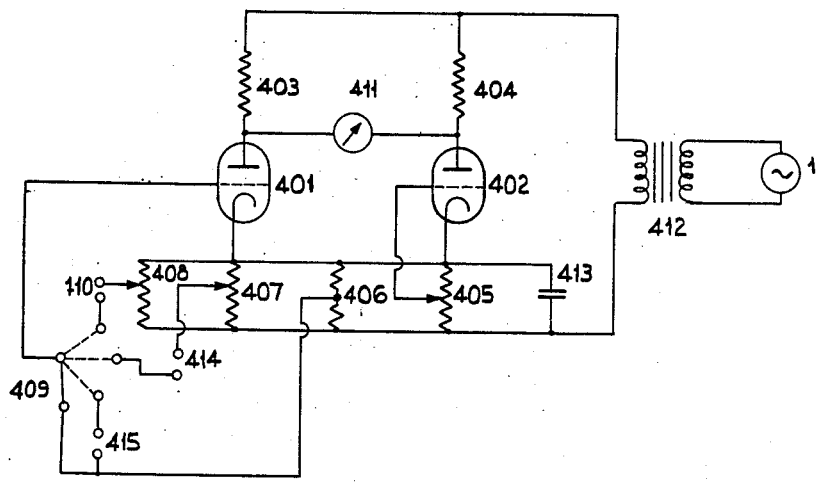

Figure 4 shows a circuit diagram of a circuit which may be employed either for measuring a direct voltage, or for observing when a direct voltage or an alternating voltage is brought to null value. It is immaterial whether either side of the applied alternating or direct voltage is earthed.

A pair of similar valves 401, 402 have their anode circuits connected across an unearthed alternating voltage supply derived through a transformer 412 from source 1. These anode circuits comprise separate and similar anode load resistors 403, 404, and a common cathode load consisting of a plurality of linear resistance potentiometers 405, 406, 407, 408 in parallel, provided with a by-pass smoothing condenser 413. The control grid of valve 402 is connected to the moveable tapping on potentiometer 405. The control grid of valve 402 is connected through switch 409 alternatively, either directly to the centre tap on potentiometer 406, or through a a pair of input terminals 415 to the center tap on potentiometer 406, or through a pair of input terminals 410 to the moveable tapping on the potentiometer 408, or through a pair of input terminals 414 to the moveable tapping on potentiometer 407. A centre-zero direct current indicator 411 is connected directly between the anodes of the valves 401, 402. No point of the valve circuit is earthed.

In order to adjust the circuit for any inequalities, the switch 409 is first placed in the attitude to connect the control grid of valve 401 directly to the centre tap on potentiometer 406, and the moveable tapping on potentiometer 405 is then moved until a null indication is obtained on indicator 411.

Switch 409 may then be thrown to the attitude in which the control grid of valve 401 is connected through terminals 410 to the moveable tapping on potentiometer 408. A direct voltage to be measured, such for example as that representing the value of $\dot{x}$ which is developed between terminals 354 and 355 of Figure 3, is applied between terminals 410. If the value of this direct voltage input is zero, a null indication will be obtained when the tapping on potentiometer 408 is moved to its middle position. Any departure from the middle position which may be necessary in order to obtain a null indication is a measure of the direct voltage input at terminals 410. This voltage is equal to the voltage drop in potentiometer 408 between the mid position and the position giving a null reading.

If it is desired to read the value of the direct voltage input at terminals 410, the moveable tapping on potentiometer 408 may be provided with a graduated scale. If, however, it is merely required that another instrument shall be set in accordance with that voltage input, then a mechanical coupling may be employed between the tapping on potentiometer 408 and the said other instrument.

If switch 409 is now thrown to the attitude in which the control grid of valve 401 is connected through terminals 414 to the moveable tapping on potentiometer 407, then this moveable tapping can be adjusted to obtain a null indication without disturbing the setting of the moveable tapping of potentiometer 408. Just as the setting of potentiometer 408 for a null indication was a measure of the direct voltage input between terminals 410, so the setting of the moveable tapping of 407 which yields a null indication is a measure of a direct voltage input applied between terminals 414.

Any desired number of further potentiometers similar to 407, 408 may be provided, each having a further pair of input terminals connected between its moveable tapping and a further position of switch 409, for the measurement of further direct input voltages.

The provision of a separate potentiometer for measuring each of the relatively invariable direct voltages, such as those representing $x$ and $y$, gives the advantage that the settings of the moveable tappings need not be disturbed when changing over from one to another. Thus the settings of the moveable tappings continue to represent the last readings of each, and will usually be approximately correct when returns are made to each for correction of their settings.

If switch 409 is thrown to the attitude in which the control grid of valve 401 is connected through terminals 415 to the centre tap on potentiometer 406, the null reading of indicator 411 will be disturbed if any voltage, direct or alternating, is applied between terminals 415. If, for example, it is desired to measure an alternating voltage such as that representing H which is developed at the output of potential divider 30, this voltage may be applied, in series with the output of a linear potentiometer connected across the alternating source 1, to the primary winding of a transformer. The secondary winding of the transformer will be connected between terminals 415. The potentiometer will then be adjusted until a null reading is obtained on indicator 411. Then the applied alternating voltage must be equal in amplitude to the output voltage of the linear potentiometer, and its value is indicated by the setting of the potentiometer.

In the predictor herein described, the alternating voltages to be nulled are preferably all in phase with source 1. It should be observed, however, that this null voltage indicating circuit is capable of use for nulling an alternating voltage of different phase unless this be quadrature. It should also be observed that a reversal of phase produces a reversal of the current through indicator 411, so a sense indication is obtained.

Figure 5:
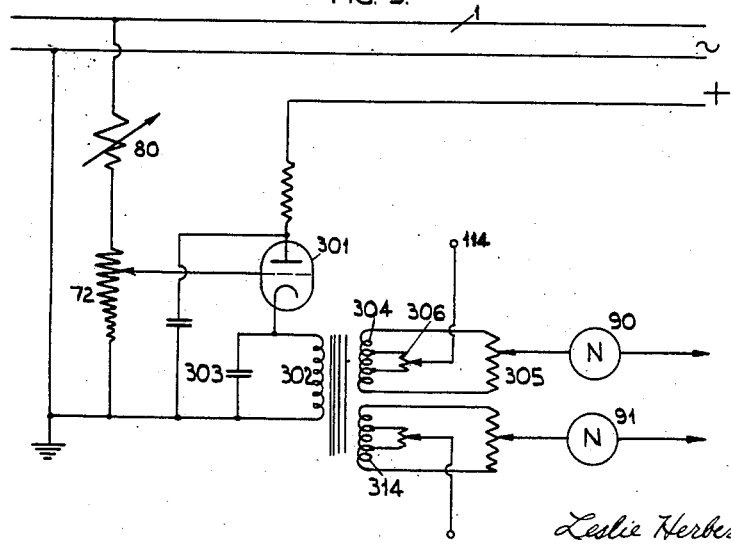

Figure 5 is a circuit diagram of a practical arrangement of the elements 80, 72, 2 and 3 of Figure 1. Potential divider 72 is a resistance potentiometer which is specially graded in accordance with an average practical value of the function relating $t_f$ and R'. This is connected in series with variable resistance 80 across alternating source. Resistance 80 is arranged to be manually adjustable to correct for the comparatively small dependence of $t_f$ on other variables, for example on H. The degree of correction necessary for a given variation of H is again dependent on R'. So variable resistance 80 is provided with a dial in the form of a graphical solid cam, i. e. a dial marked with curves, each representing a different constant value of H, arranged to be read against a pointer which moves in accordance with the setting of potential dividers 70, 71, 72 representing the value of R'.

The tapping of potentiometer 72 is not loaded, as it is directly connected to the input of cathode follower valve 301. The cathode load of this valve is an iron-cored transformer having its primary winding 302 tuned to the frequency of source 1 by condenser 303. This transformer has a plurality of secondary windings for assisting in the generation of various voltages dependent on $t_f$, but only two of these secondary windings 304 and 314 are shown in Figure 5.

A linear potentiometer 305 is connected across winding 304, and its moveable tapping is connected to one side of a null voltage indicator 90. Another linear potentiometer 306 is connected across a few turns in the middle of winding 304, and its movable tapping is connected to terminal 114, which has an alternating voltage proportional to $x$ and may, for example, be terminal 114 of Figure 2. The moveable tapping of potentiometer 305 is set in accordance with the value of $\dot{x}$ (rate of change of $x$). It may, for example, be mechanically coupled with the tapping of a potentiometer such as 408 of Figure 4, in a nulling circuit where the input terminals (410 of Figure 4) are connected to a circuit for measuring $\dot{x}$. The tapping of potentiometer 306 is manually set in accordance with the observed value of $w \cos B_w$, i. e. the component of wind velocity in the direction in which $x$ is measured. Thus, there are added to the voltage of terminal 114, which is proportional to $x$:

(1) A voltage proportional to $t_f$ and $\dot{x}$, representing the predicted component of movement of the target.

(2) A voltage proportional to $t_f$ and $w \cos B_w$, representing the component correction for wind velocity.

The scales of these added voltages are suitably chosen so that the resultant voltage applied to null voltage indicator 90 represents $x_f'$.

A similar circuit connected to secondary winding 314 produces a resultant voltage representing $y_f'$ for application to null indicator 91.

Figure 6:
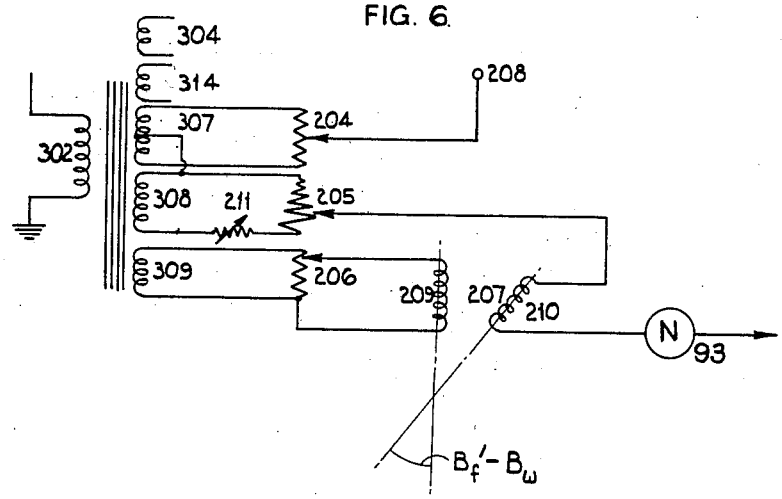

Figure 6 is a circuit diagram of a practical arrangement of element 4 of Figure 1.

Windings 307, 308 and 309 are further secondary windings on the transformer of Figure 5, so voltages proportional to $t_f$ are developed across these windings.

Across winding 307 there is connected a linear potentiometer 204. The moveable tapping on this potentiometer is connected to terminal 208, which has an alternating voltage proportional to H and may, for example, be the terminal corresponding to 114 in a circuit similar to that of Figure 2 but modified to measure H instead of $x$.

The moveable tapping of potentiometer 204 is set in accordance with the value of $\dot{H}$. It may, for example, be mechanically coupled with the tapping of a potentiometer such as 408 of Figure 4, in a nulling circuit where the input terminals (410 of Figure 4) are connected to a circuit for measuring $\dot{H}$.

The voltage developed across potentiometer 204 is proportional to $t_f$, and as the tapping is set in accordance with the value of $\dot{H}$, the voltage developed between the moveable tapping on potentiometer 204 and the centre tap of winding 307 will be proportional to $\dot{H} t_f$ which is the predicted vertical component of movement of the target.

The drop of the trajectory, H'', is approximately proportional to $t_f$ and to a function of R'. The potentiometer 205, which is connected in series with a variable resistance 211 across winding 308, is graded in accordance with an average practical value of the function relating $$\frac{H''}{t_f}$$

with R'. The moveable tapping of potentiometer 205 is set in accordance with the value R', and for this purpose it may be ganged with potential dividers 70, 71, 72 of Figure 1. Thus, the voltage developed between the moveable tapping on potentiometer 205 and one end of winding 308, which is connected to the centre tapping on winding 307, represents the value of H''. Variable resistance 211 is arranged to be manually adjustable to correct for the comparatively small dependence of $$\frac{H''}{t_f}$$

on variables other than R'.

The necessary vertical correction for wind is approximately proportional to $wt_t \cos (B_f' - B_w)$. This is provided as follows:

Across winding 309 there is connected a linear potentiometer 206, the tapping of which is manually set in accordance with the observed value of $w$.

A magslip resolver 207 is provided in which the "stator" and "rotor" are both rotatable. In general it is desirable for magslip resolvers to be operated at constant input voltage, owing to the errors introduced by non-linearity of the magnetisation characteristics of the iron. In this case, however, the correction which is applied by the magslip resolver is so small that such errors may be neglected. The stator is arranged to be rotated through an angle in accordance with the value of $B_f'$ and the rotor in accordance with the value of $B_w$.

The stator winding 209, used as primary, is connected between one end of potentiometer 206 and the moveable tapping thereof, and thus receives a voltage proportional to $wt_t$. The voltage developed across rotor winding 210 is proportional to $wt_t \cos (B_f' - B_w)$.

The scales of the voltages added to that of terminal 208 by potentiometers 204, 205, and by the rotor winding 210, are suitably chosen so that the resultant voltage applied to null voltage indicator 93 represents H'.

Figure 7:
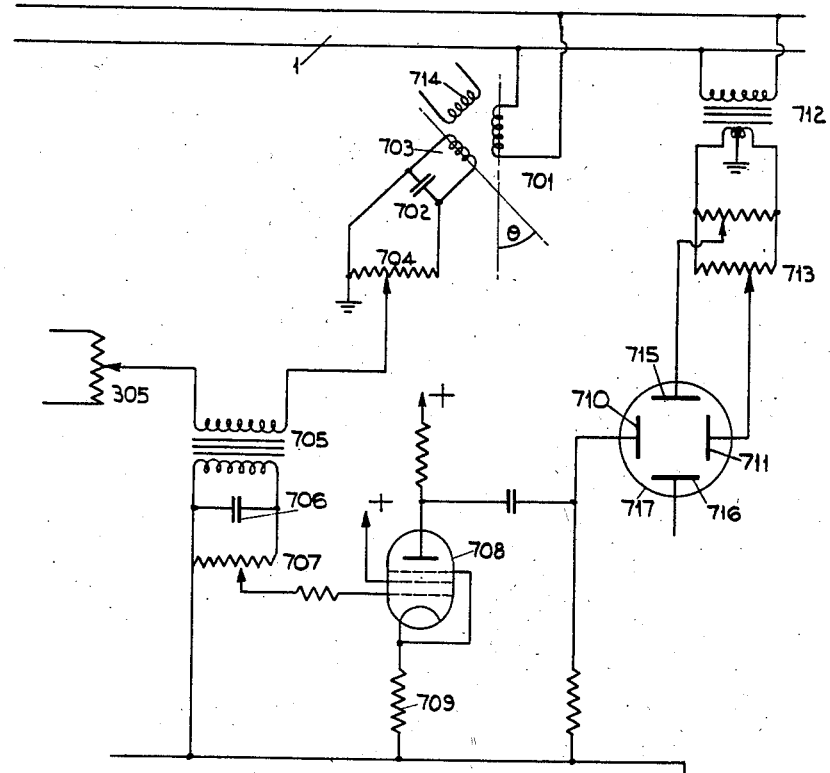

Figure 7 shows a circuit diagram of a practical arrangement of the elements 40, 50 and 90 of Figure 1. The potential divider 40 of Figure 1 is embodied in a magslip resolver 701. A condenser 702 is connected across the cosine secondary winding 703 to maintain the output voltage exactly in time-phase with the alternating voltage source 1. Across this secondary winding 703 there is also connected a linear potentiometer 704, representing potential divider 50 of Figure 1. The moveable tapping of this potentiometer is connected through the primary winding of transformer 705 to a point having a voltage proportional to $x_t'$, shown as the moveable tapping on potentiometer 305 of Figure 5.

A condenser 706 is connected across the secondary winding of transformer 705 to tune it to the frequency of source 1. This winding is also connected over potentiometer 707 to the input of a conventional pentode valve amplifier, comprising pentode 708 and having negative feed-back produced by cathode resistor 709. The output of this amplifier is applied to deflector plate 710 of a cathode ray tube 717. The opposite plate 711 is provided with an alternating shift voltage from the source 1 through transformer 712 and potentiometer 713.

When magslip resolver 701 is set so that its angle $\theta$ is equal to $B_f'$, and the tapping of potentiometer 704 is set to represent $r_t'$, zero voltage is developed across primary winding 705 and a null deflection is produced by deflector plates 710 and 711.

The sine secondary winding 714 of magslip resolver 701 is connected in a similar circuit to produce a voltage proportional to $y_t'$ and the second pair of deflector plates 715 and 716 of the cathode ray tube are employed as the null indicator 91. Thus, the values of $B_f'$ and $r_t'$ may continuously be derived from the setting of magslip resolver 701, and from the setting of potentiometer 704 ganged with a similar potentiometer in the $y_t'$ circuit, if null indications in both directions are maintained on the cathode ray tube.

Owing to the fact that the output voltages from potential dividers 50 and 51 are both responsive to adjustment of the ganged potential dividers 50—52 in accordance with the same law, in this instance a linear law, and owing to the fact that these output voltages are respectively responsive to the setting of ganged potential dividers 40, 41, in accordance with the cosine and the sine respectively of the angle represented by this setting, it will be found that adjustment of the setting of the magslip resolver 701 (potential dividers 40 and 41) will produce a movement of the cathode ray tube spot in one direction, while an adjustment of the tapping of potentiometer 704 (potential dividers 50 and 51) will produce a movement of the spot in the perpendicular direction, although the absolute directions of these movements are variable.

If the observed coordinates of the target are rapidly, and perhaps irregularly, varying, it becomes a matter of considerable difficulty to adjust the magslip resolver 701 and the tapping of potentiometer 704 so as to bring the spot to the origin on the cathode ray tube screen and to keep it there.

For assistance in this operation, it is preferred to provide a hair line indicator across the screen, arranged to be rotated in such manner that its direction is always parallel to the direction in which the spot will move when one of the controls, say the angle of magslip resolver 701, is adjusted. It may be preferred that two mutually perpendicular hair lines be provided, these being distinguished from each other for example by different colouring.

The necessary rotation of the hair lines may be effected by mechanical coupling of their rotatable support with the rotor of magslip resolver 701.

A similar arrangement is provided for elements 60, 70 and 92 and elements 61, 71 and 93. As, however, the voltages added by elements 2 and 3 of Figure 1 are dependent on the value of $t_t$ derived from element 72, the values of $B_f'$, $r_t'$, E and R' will only be correctly indicated when null indications are obtained simultaneously on all of the null indicators 90, 91, 92 and 93.

An alternative arrangement is diagrammatically illustrated in the fragmentary diagram Figure 7A. The valves 708A and 708B correspond to valve 708 of Figure 7 and of the similar circuit connected to secondary winding 714 of magslip resolved 701. The outputs of valves 708A and 708B, instead of being applied to the deflector plates of the cathode ray tube, are applied to the two primary windings 720 and 721 arranged at 90° to each other on the stator of a magslip resolver 727. The rotor of this magslip resolver 727 is mechanically coupled to the ganged potential dividers 40, 41, Figure 1, with the result that the voltage developed across one of the secondary windings 723 is proportional to the error in setting of potential dividers 40, 41, while the voltage developed across the other secondary winding 724 is proportional to the error in setting of potential dividers 50, 51, 52. Condensers 728 and 729 connected across the primary windings preferably have such value that the voltages developed across the secondary windings are in phase with the voltage inputs at the control grids of valves 708A and 708B. The operation of the magslip resolver with varying primary voltages is in this instance immaterial, because the secondary voltages are not to be measured but are to be brought to zero value.

Servo-motors 725 and 726 are shown connected to the rotor windings, and these are arranged to adjust the potential dividers in the required direction to correct their settings. If, however, manual adjustment of these potential dividers is desired, indicators may be substituted in Figure 7A for the servo-motors 725, 726. A null indication on one of these will show that one gang of the potential dividers is correctly set, and a null indication on the other that the other gang is correctly set.

Figure 8 shows a circuit diagram of a cathode ray tube arranged for alternating current operation.

The cathode ray oscillograph tube 801 has a cathode 802, a beam current control electrode 803, a first anode 804, a focussing electrode 805 and a final anode 806. These electrodes together form the electron gun. The electron beam leaving the final anode 806 passes between two pairs of electrostatic deflector plates 807, 808 and 809, 810, which are arranged to produce deflections in mutually perpendicular directions. The beam finally impinges in a spot on the fluorescent screen 811.

The exciting and deflection voltages are all derived from the common alternating source 1, which may have a frequency of 50 cycles.

Transformer 812, which has its primary winding 813 connected across source 1, is provided with three separate secondary windings 814, 815, 816.

The electron gun is excited from winding 814. One end of this winding is earthed and connected to the final anode 806. A potentiometer 817 is connected across winding 814 and the alternating voltages for the other electrodes of the gun are derived from tappings thereon. Thus the focussing electrode 805 and the cathode 802 are connected to tappings 818 and 819 respectively. The first anode 804 is shown as connected directly to the final anode 806; but if the gun is so designed that this first anode would ordinarily, with direct voltage excitation, be excited at a potential negative with respect to the final anode, then this first anode 804 should also be connected to a tapping on potentiometer 817.

The beam current control electrode 803, which in normal direct voltage operation is maintained negative to cathode, may, in the arrangement according to the invention, be excited with alternating voltage or direct voltage, but it is preferably excited with a combination of both. In the arrangement shown in Figure 8, it is excited relative to cathode with an alternating voltage drop derived from potentiometer 817 superposed on a direct voltage established across resistance 821. This resistance 821 is the load of a diode rectifier 822, which is connected through coupling condenser 823 between tapping 820 and the end of potentiometer 817 remote from earth.

When the potential of the final anode of an electron gun is varied relative to cathode, the focus is maintained if the potentials relative to cathode of the focussing electrode and of all other electrodes which influence the focus, are varied in proportion. If therefore all the electrodes of the gun are excited with alternating voltages relative to cathode in the same phase, then beam current will flow during every half cycle while the anodes are positive to cathode and the focus will be substantially correct throughout these half cycles. The focus is not, however, disturbed by the beam current control electrode 803, and it is preferred in practice that this be maintained negative to cathode so as to suppress the beam for a period at each end of the half cycle. Very satisfactory operation is obtained if these periods of suppression are both of the order of one-sixth of a cycle, so that beam current will flow for the central one-third of the positive half cycle. This may be effected by holding the potential of beam current control electrode 803 at an appropriate direct voltage negative to cathode.

A further refinement, however, is to increase the beam current substantially, during the fraction of a cycle while it is permitted to flow, beyond the value which it would attain if the beam current control electrode 803 were maintained at constant potential negative relative to cathode. For this purpose it is preferred to superpose an alternating voltage between the beam current control electrode 803 and the cathode 802, this being in phase with the voltages between the anodes and the cathode.

The deflection voltages are derived from secondary winding 816 and their amplitudes are modulated, in accordance with phenomena to be represented, by modulators 824 and 825 respectively. Figure 8 shows these voltages applied asymmetrically to deflector plates 808 and 810, and only shift voltages applied to the opposite plates 807 and 809. These shift voltages, also taking the form of alternating voltages in phase with those applied to the electron gun, are derived from tappings on potentiometers 826, 827, connected across the secondary winding 815, which has an earthed centre-tap. The deflection voltages may, however, be applied symmetrically, with or without the superposition of shift voltages, if this is preferred.

The angle of deflection of the electron beam is proportional to the potential difference between a pair of deflector plates, but is inversely proportional to the potential difference between the final anode of the electron gun and cathode. When, therefore, an alternating voltage is applied between a pair of deflector plates in phase with the alternating voltage between final anode and cathode, the spot where the beam impinges on the fluorescent screen is theoretically stationary. Its position is determined by the amplitude of the alternating deflection voltage, assuming that the amplitude of the alternating gun voltage remains constant. The arrangement may therefore be regarded as inherently a demodulator; the two coordinates of the position of the spot on the screen represent the amplitudes of the output voltages from modulators 824 and 825. The position is independent of the voltage and frequency of the source 1.

In comparison with results which can be obtained by demodulating an alternating voltage which is modulated in amplitude, and by then exhibiting the modulation on a cathode ray tube excited with direct voltage in the ordinary way, this system provides, in addition to the other advantages, a feature of sense indication. So long as the output voltage from modulator 824 is in phase with the voltage of final anode 806 relative to cathode, the beam will be deflected towards the deflector plate 808. If, however, the modulation is carried through zero and beyond, so that the output voltage of modulator 824 is in anti-phase with that of the final anode relative to cathode, the deflection of the beam is towards deflector plate 807.

The cathode ray tube 717 of Figure 7 is preferably excited in the manner shown in Figure 8. The circuit which produces on deflector plate 710 an alternating voltage in phase with source 1, but varying in amplitude in accordance with the degree of unbalance of the voltages opposed to each other in the primary circuit of transformer 705, represents the modulator 824.

If it is desired to display the values of any quantities, such as $x$ and $y$, represented by alternating voltages, a similar arrangement may be employed. In that case modulator 825 may take the form of the circuit of Figure 2, and modulator 824 that of a similar circuit for producing from secondary winding 103 a voltage proportional to $y$. Terminal 114 will be connected to deflector plate 810 and, if symmetrical deflection is desired, terminal 115 to deflector plate 809. The shift circuit based upon secondary winding 815 may be omitted, all necessary shift voltages being inserted in the manner described with reference to transformer 117 and potentiometer 116. If the deflector plates 807, 808 have greater sensitivity than plates 809, 810, compensation for this may be effected by connecting the output terminals corresponding to 114 and 115 to tappings on the primary and secondary sections of the auto-transformer corresponding to 112.

The transmission of the continuously varying settings of potential dividers 40, 41 and of potential dividers 60, 61, representing the values of $B_r'$ and $E$ respectively, to the guns served by the predictor, is preferably effected by transmitting and receiving selsyns or equivalent devices, the transmitters being coupled to the moving elements of the said potential dividers.

The transmission to the guns of the value of $t_r$ is preferably also effected by transmitting and receiving selsyns. In order to apply the value of $t_r$ to the transmitting selsyn, a further alternating voltage nulling circuit may be provided operating on the principle described with reference to terminals 415 in Figure 4. The input terminals corresponding to 415 are connected to a further secondary winding on the transformer of Figure 5, in series with a tapped-off portion of a further potentiometer connected across source 1. The moveable tapping of said further potentiometer is mechanically coupled to the transmitting selsyn. As, however, the transmission of the value of $t_r$ should be continuous, a servo-mechanism should be substituted for the null voltage indicator 411, and should be arranged to move the tapping of said further potentiometer until a null is obtained.

We claim:

1. In an electrical calculating apparatus, means for producing three alternating voltages all in the same phase but varying in amplitude proportionally to three factors (L sin $a$), (L cos $a$ sin $b$), and (L cos $a$ cos $b$), where L is a variable length factor and $a$ and $b$ are variable angles, said means comprising a source of alternating voltage of low frequency and substantially constant amplitude, two magslip resolvers settable to angles $a$ and $b$ respectively, each of said resolvers having a primary winding connected across said source and two secondary windings yielding output voltages proportional respectively to the sine and cosine of the angle to which the resolver is set, a three-gang linear potentiometer having two of its sections connected one across each of the secondary windings of the $b$ resolver and its third section connected across said source, a two-gang linear potentiometer having its two sections connected one across each of the secondary windings of the $a$ resolver and settable as a measure of L, and means to compare the output voltage from the third section of said three-gang potentiometer with the output of that section of the two-gang potentiometer which is connected across the cosine winding of the $a$ resolver, the three alternating voltages having amplitudes proportional to the factors (L sin $a$), (L cos $a$ sin $b$) and (L cos $a$ cos $b$) appearing respectively at the output of that section of the two-gang potentiometer which is connected across the sine winding of the $a$ resolver, the output of that section of the three-gang potentiometer which is connected across the sine winding of the $b$ resolver and the output of that section of the three-gang potentiometer which is connected across the cosine winding of the $b$ resolver when the $a$ resolver is set to angle $a$, the $b$ resolver is set to angle $b$, the two-gang potentiometer is set as a measure of L, and the three-gang potentiometer is set to give an output from its third section such that a null indication is given on said voltage comparing means.

2. In an electrical calculating apparatus, means for producing three alternating voltages all in the same phase but varying in amplitude proportionally to (L sin $a$), (L cos $a$ sin $b$), and (L cos $a$ cos $b$), where L is a variable length factor and $a$ and $b$ are variable angles, said apparatus comprising a source of alternating voltage of low frequency and substantially constant amplitude, a magslip resolver having its primary winding connected across said source and settable to angle $b$, and a cascade arrangement of individual sections of one three-gang potentiometer having linear laws with individual sections of another three-gang potentiometer having two sections each graded with cosine laws and one section graded with a sine law, the cascade of one linear section and said sine section being connected across said source and the cascades of the other linear sections and said cosine sections being connected one across each of the secondary windings of said magslip resolver, said graded potentiometers being settable to angle $a$ and said linear potentiometer being settable to length factor L.

3. An electrical system for converting between the polar coordinates of the range, elevation and bearing of an object in relation to the origin of the system of coordinates and Cartesian coordinates similarly locating the object in relation to the origin, said electrical system comprising a constant voltage source, a first trigonometric voltage divider angularly settable as a measure of elevation, and including two sections related to yield voltages substantially related as the sine and cosine of the angular setting, a second trigonometric voltage divider angularly settable as a measure of the bearing and similarly including sine and cosine sections, a first potentiometer and a second potentiometer, said first and second potentiometers being alike and ganged together and jointly settable as a measure of range, said first potentiometer being connected in a cascaded channel to said source with the sine section of said first trigonometric voltage divider and said second potentiometer being connected in a cascaded channel to said source with the cosine section of said first trigonometric voltage divider, a third potentiometer, a fourth potentiometer and a fifth potentiometer, said third, fourth and fifth potentiometers being alike and ganged together, said fifth potentiometer being energized directly by said source, said third potentiometer being connected in a cascaded channel to said source with the cosine section of said second trigonometric voltage divider and said fourth potentiometer being connected in a cascaded channel to said source with the sine section of said second trigonometric divider, and a null indicator for indicating a balance or lack thereof between the voltages from said fifth potentiometer and the cascaded channel which includes said second potentiometer, whereby the voltages from the cascaded channels including the first, third and fourth potentiometers will yield voltages properly related to locate an object according to the Cartesian system of coordinates when the trigonometric voltage dividers are set as a measure of elevation and bearing, the first and second potentiometers are jointly set as a measure of range and the third, fourth and fifth potentiometers are jointly set to obtain an indication of balance on the null indicator.

4. An electrical system for converting between the coordinates of range, elevation and bearing of an object in relation to the origin of a polar system of coordinates and factors respectively representing mutually perpendicular dimensions for locating an object in relation to the origin of a Cartesian system of coordinates, said electrical system comprising a source of voltage of substantially constant amplitude, a trigonometric voltage divider including two sections ganged together and jointly settable to represent bearing and respectively constructed to yield voltages substantially proportional to the sine and cosine laws and two three-gang potentiometers the sections of one hereinafter called "A" having like laws and settable to represent range and the other hereinafter called "B" having two sections each graded with cosine laws and one section graded with a sine law and settable to represent elevation, a cascade connection of one of the like sections of the said "A" three-gang potentiometer and the sine section of said "B" three-gang potentiometer being connected across said source and two cascade connections to said source each including one of the other like sections of said "A" three-gang potentiometer, one of the cosine sections of said "B" three-gang potentiometer and one of the sections of the trigonometric voltage divider, whereby the three cascades will yield voltages representing the position of an object according to Cartesian coordinates corresponding to the same position in polar coordinates to which the trigonometric voltage divider and the two potentiometers have been set.

5. In an electrical calculating apparatus, a source of voltage of substantially constant amplitude, means for deriving from said source three voltages proportional to represent a position in a system of rectangular coordinates and including three groups of ganged voltage dividers settable to represent the radius and the two angles, respectively, defining the said position in a polar system of coordinates, means for producing correction voltages, means for combining said correction voltages with said three voltages separately to produce three corrected voltages representing a corrected position in the system of rectangular coordinates, means, including other groups of potentiometers settable to indicate the corrected radius and two angles in the polar system of coordinates, for deriving from said source three further voltages representing the corrected position in the system of rectangular coordinates, and means for comparing each of the three corrected voltages with that further voltage of said three further voltages which represents the corresponding rectangular coordinate of the position.

6. Apparatus according to claim 5 wherein the means for producing correction voltages comprises means including a potentiometer ganged to one of said other groups of potentiometers to derive a correction voltage from said source, and means for supplying said correction voltage to at least one of said means for combining said correction voltage with said three voltages separately.

7. Apparatus according to claim 5 in which the said means for comparing each of the three corrected voltages with that further voltage of said three further voltages which represents the corresponding rectangular coordinate of the position comprises means including a two-dimensional null voltage indicator for comparing two pairs of said voltages simultaneously, said indicator being connected between the voltage combining means providing two of said three corrected voltages and the means for deriving the two corresponding voltages of said three further voltages.

8. Apparatus according to claim 7 in which the said two-dimensional null voltage indicator comprises two comparing means each connected between the voltage combining means providing one of said corrected voltages and the means for deriving the corresponding further voltage with which it is to be compared for producing a voltage proportional to the degree of unbalance between said voltages to be compared, and a cathode ray oscillograph tube having means excited by one of said comparing means for deflecting the spot on the screen of said tube in one direction and means excited by the other of said comparing means for deflecting the spot in the perpendicular direction.

9. In an electrical calculating system for ascertaining the two-dimensional polar coordinates of a point, the corresponding Cartesian coordinates of which are represented by the amplitudes of two given co-phased alternating voltages of low frequency, the combination of a source of alternating voltage of substantially constant amplitude, a magslip resolver having a primary winding connected across said source and having sine and cosine secondary windings settable in relation to said primary winding to represent various angles in the polar coordinates, a two-gang potentiometer having its sections one connected across each of the secondary windings of said magslip resolver, a pair of null voltage indicators connected one to each of said potentiometer sections, and conductor means connected to said null voltage indicators adapted to supply the two given voltages thereto for comparison with the voltages from said potentiometer sections.

10. Apparatus according to claim 9 in which the said null voltage indicators are combined in a two-dimensional null voltage indicator, said two-dimensional null voltage indicator having two single-dimensional sections connected respectively one section between one of said potentiometer sections and the conductor means adapted to supply one of the two given voltages and the other section between the other potentiometer section and the conductor means adapted to supply the other given voltage.

11. Apparatus according to claim 10 in which the said two-dimensional null voltage indicator comprises two comparing means each adapted to produce a voltage proportional to the degree of unbalance between the voltages to be compared, one of said comparing means being connected between one of said potentiometer sections and the conductor means adapted to supply one of the two given voltages and the other comparing means being connected between the other potentiometer section and the conductor means adapted to supply the other given voltage, and a cathode ray oscillograph tube having means excited by one of said comparing means for deflecting the spot on the screen of said tube in one direction and means excited by the other of said comparing means for deflecting the spot in the perpendicular direction.

LESLIE HERBERT BEDFORD.
JOHN BELL.
ERIC MILES LANGHAM.

REFERENCES CITED

The following references are of record in the file of this patent:

UNITED STATES PATENTS

| Number | Name | Date |
| --- | --- | --- |
| 1,069,187 | Ryan | Aug. 5, 1913 |
| 1,345,706 | Routin | July 6, 1920 |
| 1,402,096 | Schneider | Jan. 3, 1922 |
| 1,626,560 | Schneider | Apr. 26, 1927 |
| 1,977,999 | Prinz | Oct. 23, 1934 |
| 2,080,186 | Reymond | May 11, 1937 |
| 2,099,994 | Wilson | Nov. 23, 1937 |
| 2,143,219 | Wenger | Jan. 10, 1939 |
| 2,208,329 | Morelock | July 16, 1940 |
| 2,251,973 | Beale et al. | Aug. 12, 1941 |
| 2,272,849 | Perkins | Feb. 10, 1942 |
| 2,303,924 | Faudell | Dec. 1, 1942 |
| 2,348,853 | Schlesinger | May 16, 1944 |
| 2,382,994 | Holden | Aug. 21, 1945 |
| 2,385,334 | Davey | Sept. 25, 1945 |
| 2,408,081 | Lovell et al. | Sept. 24, 1946 |
| 2,467,646 | Agins | Apr. 19, 1949 |
| 2,493,183 | Boghosian | June 3, 1950 |

FOREIGN PATENTS

| Number | Country | Date |
| --- | --- | --- |
| 466,131 | Great Britain | May 24, 1937 |
| 718,305 | Germany | Apr. 7, 1942 |